July 10, 1962

B. O. AYERS 3,043,128

ANALYZER

Filed Sept. 17, 1958

INVENTOR.
B.O. AYERS

BY *Hudson & Young*

ATTORNEYS

July 10, 1962 B. O. AYERS 3,043,128
ANALYZER
Filed Sept. 17, 1958 2 Sheets-Sheet 2

INVENTOR.
B.O. AYERS
BY *Hudson & Young*
ATTORNEYS

United States Patent Office 3,043,128
Patented July 10, 1962

3,043,128
ANALYZER
Buell O. Ayers, Bartlesville, Okla., assignor to Phillips Petroleum Company, a corporation of Delaware
Filed Sept. 17, 1958, Ser. No. 761,528
2 Claims. (Cl. 73—23)

This invention relates to the analysis of fluid streams to detect constituents or groups of constituents present therein.

In various industrial and laboratory operations there is a need for analytical procedures which are capable of measuring the concentrations of constituents of fluid mixtures. Analyzers employing principles of chromatography are being developed at the present time to meet this need. One particular type of such analyzers employs a column which is filled with a material that selectively retards the passage therethrough of the constituents of a fluid mixture to be analyzed. A furnace is placed at one end of the column so as to produce a temperature gradient, whereby the inlet end of the column is maintained at the higher temperature. A fluid mixture to be analyzed is introduced into the column at this inlet end. With an arrangement of this type, the most volatile or least strongly adsorbed constituents of the sample move rapidly until they reach colder regions of the column where the speed of movement is decreased due to decreased volatility or greater adsorption. The more strongly adsorbed constituents tend to be held in regions of higher temperature so that a separation is effected. The furnace is then moved along the column so that the individual constituents are desorbed and eluted in succession. Suitable means are provided for detecting the presence of these constituents in the effluent gas from the column.

In an analyzer of this type, the positions of the individual constituents, the separations between constituents, and the widths of the zones of the constituents within the column all depend upon the furnace temperature gradient, carrier gas flow rate and rate of travel of the furnace. For most analyses, a linear temperature gradient is desirable. An improved furnace has recently been developed to establish a linear temperature gradient through the furnace. This furnace comprises an elongated member of heat conductive material which surrounds the analyzer column. The two ends of the elongated member are maintained at constant temperatures which are different from one another so that a temperature gradient is established by the elongated member. The elongated member is surrounded by insulating material so that the temperature gradient remains substantially uniform during the analysis. An auxiliary heater preferably surrounds the elongated member throughout its length to compensate for the transfer of heat between the member and the column. It has been found that such a furnace assembly provides a uniform temperature gradient and permits the analyzer to separate constituents efficiently.

When such a linear temperature gradient is established, each constituent of the sample mixture reaches a steady state position at a certain temperature in the furnace. The separation of the constituents in the furnace is determined to a large extent by the temperature gradient along the furnace. While an increase in the temperature gradient permits more constituents to be contained in a furnace of a given length, this results in the constituents being moved closer together which increases the difficulty of making a separation. Furthermore, if the highest temperature in the furnace is lower than the temperature required to displace some of the constituents of the mixture, the column remains contaminated after completion of an analysis cycle.

In accordance with the present invention, an improved furnace is provided for use with a chromatographic analyzer. This furnace includes heating elements which establish a linear temperature gradient over a part of the desired temperature range. Additional heating elements are spaced on both sides of the region of the linear temperature gradient. The auxiliary heating element which leads the furnace removes sample constituents having lower equilibrium temperatures than the constituents to be measured. The auxiliary heating element which trails the furnace purges the more strongly bound constituents from the column.

Accordingly, it is an object of this invention to provide an improved analyzer to detect the constituents of fluid mixtures.

Another object is to provide a novel furnace for use with a thermochromatographic analyzer.

Other objects, advantages and features of this invention should become apparent from the following detailed description which is taken in conjunction with the accompanying drawing in which.

Figure 1:
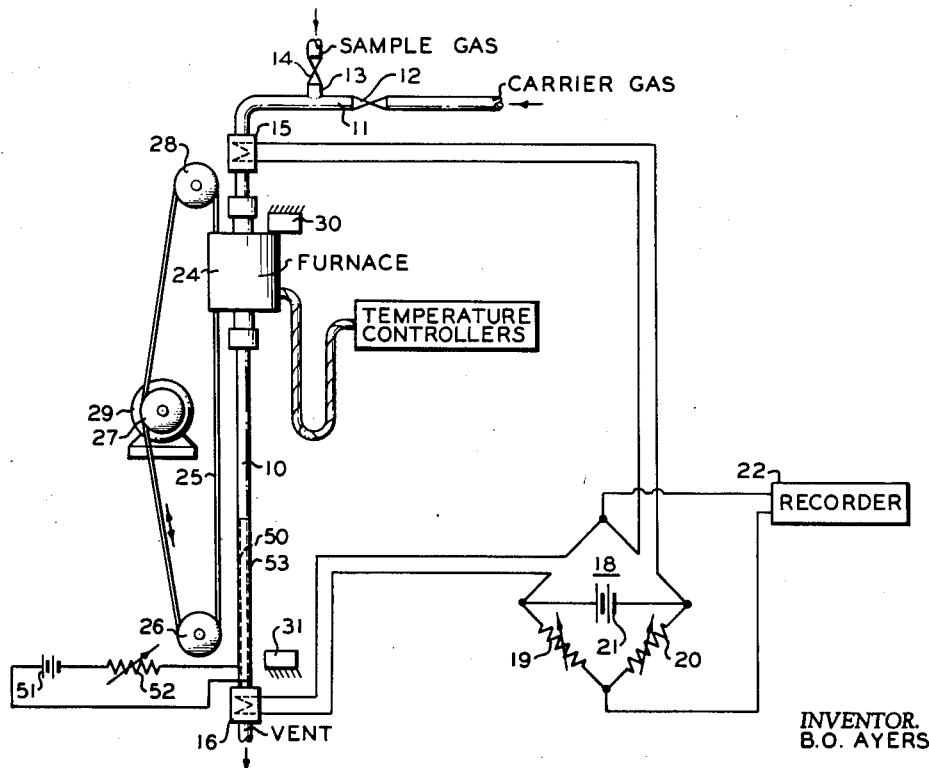
FIGURE 1 is a schematic representation of the thermochromatographic analyzer of this invention.

Referring now to the drawing in detail and to FIGURE 1 in particular, there is shown a vertical column 10 which is filled with a material that selectively retards the passage therethrough of the constituents of a fluid mixture to be analyzed. This column can be filled with an adsorptive material, such as silica gel, alumina or charcoal, or with an inert solid, such as pulverized brick, which is coated by a solvent such as hexadecane or benzyl ether. A conduit 11, which has a valve 12 therein, communicates with the upper end of column 10 to introduce a carrier gas into the column. Examples of suitable carrier gases include helium, hydrogen, nitrogen, air, argon and carbon dioxide. A gas sample to be analyzed is introduced into the top of column 10 through a conduit 13 which has a valve 14 therein. In some analyses, the gas sample alone can be introduced into column 10. Valves 12 and 14 can represent a rotary sample valve, if desired, to introduce predetermined volumes of gas sample into column 10. First and second thermal conductivity cells 15 and 16 are positioned adjacent the respective inlet and outlet ends of column 10. These thermal conductivity cells preferably comprise temperature sensitive resistance elements which are connected in adjacent arms of a Wheatstone bridge network 18. Network 18 includes balancing resistors 19 and 20 and a voltage source 21 connected across first opposite terminals. The second opposite terminals of the bridge network are connected to a recorder 22 which provides an indication of the difference between the thermal conductivities of the gases flowing through cells 15 and 16. It should be noted, however, that other types of detectors known in the art can be employed in place of the thermal conductivity cells.

An annular furnace 24 surrounds column 10 and is adapted to move longitudinally thereof. A cable 25 is attached to furnace 24 and extends about a stationary guide wheel 26, a power driven wheel 27 and a second stationary guide wheel 28 back to furnace 24. Wheel 27 is adapted to be rotated by a reversible motor 29 which serves to move furnace 24 downwardly or upwardly. Bumpers 30 and 31 are provided to stop the furnace at the two ends of the column.

Figure 2:
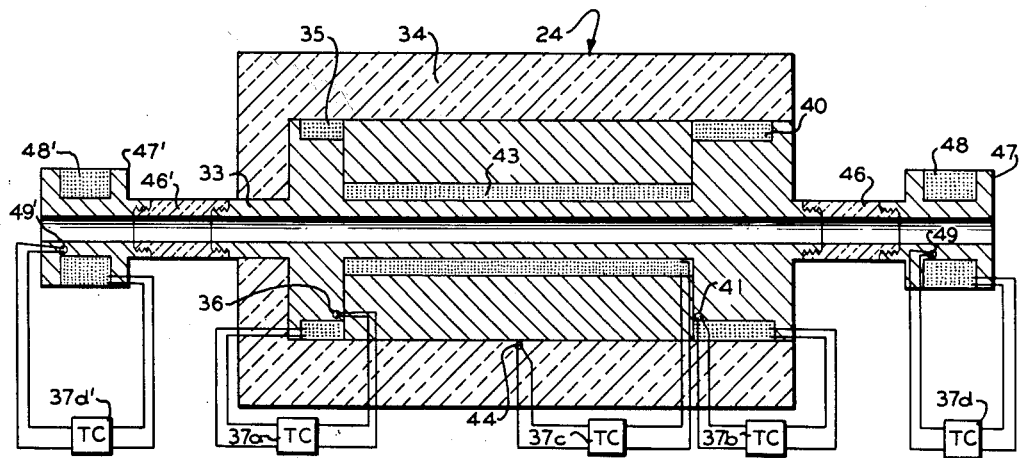
FIGURE 2 is a sectional view of the furnace employed in the analyzer of FIGURE 1.

Furnace 24 is illustrated in detail in FIGURE 2. This furnace is provided with a central diffuser 33 which is formed of a metal, such as aluminum, that has good heat conducting properties. Diffuser 33 is surrounded by a mass of heat insulating material 34. A first electrical heating coil 35 is mounted on diffuser 33 near the end of the furnace which is adjacent the inlet end of column 10. A temperature sensing element 36 is mounted within diffuser 33 adjacent heating coil 35. This sensing element actuates a temperature controller 37a which regulates the amount of current supplied to heater 35 so as to maintain a predetermined constant temperature at the end of the diffuser adjacent element 36. Any conventional temperature control mechanism known in the art can be employed for this purpose. A second electrical heating coil 40 is mounted on diffuser 33 adjacent the second end of furnace 24. A temperature sensing element 41 is mounted within the diffuser adjacent coil 40 to actuate a temperature controller 37b to regulate the amount of current supplied to coil 40. The second end of the diffuser is thus maintained at a constant predetermined temperature. The temperature adjacent element 41 normally is maintained lower than the temperature at the region of element 36 so that a temperature differential exists along the diffuser. An elongated electrical heating coil 43 is positioned within diffuser 33 between heating coils 35 and 40. A temperature sensing element 44 is positioned within diffuser 33 near the mid-point thereof so as to actuate a temperature controller 37c to regulate the current supplied to coil 43. The temperature in the region of element 44 is maintained at a value intermediate the temperatures at the regions of elements 36 and 41.

A rod 46 of heat insulating material is threaded to the first end of diffuser 33, and a support 47 of heat conductive material is threaded to the second end of rod 46. Support 47 carries a heating coil 48. A temperature sensing element 49 is secured to support 47 to actuate a temperature controller 37d to regulate the amount of current supplied to coil 48. A similar structure, with corresponding elements indicated by primed reference numerals, is attached to the end of diffuser 33 adjacent the inlet end of column 10. The temperature adjacent element 49 normally is maintained at a value not substantially greater than the temperature adjacent element 41. The temperature adjacent element 49' normally is maintained at a value greater than the temperature adjacent element 36.

At the beginning of an analysis cycle, furnace 24 is positioned adjacent the inlet end of column 10, as illustrated in FIGURE 1. A gas sample to be analyzed is introduced into the column, either alone or in admixture with the carrier gas, so as to flow past furnace 24. The least strongly adsorbed constituents of the sample stream move rapidly through the conduit until they reach relatively cool regions. The speeds of movement of the constituents are then slowed down due to the greater adsorption. The more strongly adsorbed constituents tend to be retained at regions of higher temperature. Motor 29 is then energized to move furnace 24 downwardly. This movement of the heating zone combined with the gas flow, either carrier or continuous flow of sample, tends to force the constituents of the sample gas through the column with the result that the constituents are eluted in sequence. The signal applied to recorder 22 is representative of the difference between the thermal conductivities of the gases flowing through respective cells 15 and 16 and thus provides an indication of the individual constituents as they appear in the column effluent.

In some operations, satisfactory results can be obtained by constructing the furnace without heating coil 43. This is particularly true when the speed of movement of the furnace is quite slow. However, in most operations this auxiliary heating coil is desirable in order to compensate for loss of heat from the diffuser into the column. It should be evident that such heat loss tends to destroy the linearity of the temperature gradient because the heat transfer into the column is greater at regions of higher temperature. Sufficient heat can be supplied by this auxiliary winding to compensate exactly for the heat transfer into the column.

In one specific embodiment of this invention, heating coils 35, 40 and 48 are each rated at approximately 200 watts. Heating coil 48' is rated at approximately 300 watts, and heating coil 43 is rated at approximately 5 watts per centimeter of length. The maximum temperature within the furnace and the temperature gradient through the furnace can be varied, depending upon the number of constituents to be separated, the affinities of the constituents for the packing material, the rates of flow, and the speed of movement of the furnace.

As an example of the operation of the analyzer of this invention, the gas sample to be analyzed contains relatively large quantities of isobutane and hydrocarbons from normal pentane through heptanes and smaller quantities of normal butane, butylenes and isopentane, the latter three constituents to be detected. Silica gel is employed as the adsorbent in the column. The sample constituents are then eluted in the order and at the temperatures $$T_{isobutane} < T_{normal\ butane} < T_{butadiene} < T_{isopentane} < T_{pentane} < T_{hexane} < T_{heptanes}.$$

The temperatures at the several heaters of the furnaces are designated by subscripts corresponding to the heaters. For example, the temperature at heater 48 is designated $T_{48}$. The relationship of the heater temperatures is as follows:

$$T_{48} = T_{40} > T_{isobutane} < T_{normal\ butane};\ T_{35} > T_{isopentane} < T_{normal\ petane};\ T_{48'} > T_{heptanes}.$$

Figure 3:
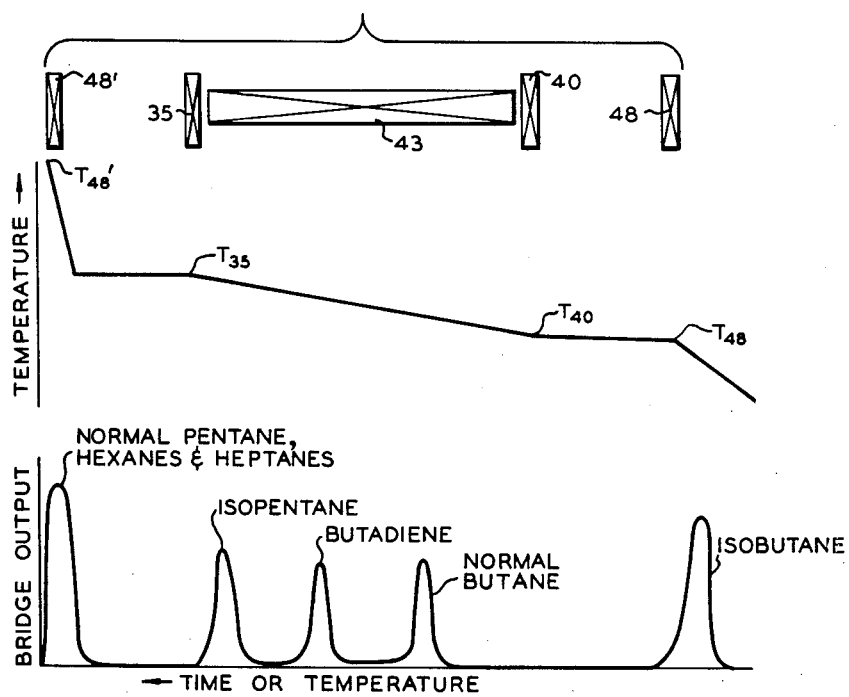
FIGURE 3 is a graphical representation of the operation of the analyzer of FIGURE 1.

The gradient between heaters 40 and 35 is maintained linear by means of heater 43. The temperature gradient and order of elution of the components is illustrated schematically in FIGURE 3.

In normal operation, it is desirable that furnace 24 be positioned at the top of column 10 and retained in place until temperature equilibrium is reached in the column. Carrier gas can be passed through column 10 at this time, if desired. Once temperature equilibrium is established, the sample to be analyzed is introduced into the column, heater 43 is turned on and the furnace is set into motion. Since the furnace must be able to pass completely over the bottom end of column 10, an auxiliary outlet conduit 50 is provided. If the sample mixture being analyzed contains high boiling constituents, it may be necessary to heat conduit 50 to prevent condensation. This can be accomplished by resistance heating wherein the wall of conduit 50 forms the resistance element. A current source 51 and an adjustable resistor 52 are connected in circuit with the wall of conduit 50 to provide heating current. Conduit 50 should not be heated unless necessary because any heat applied at this point tends to upset the temperature gradient across the furnace as the furnace passes over the end of column 10. Conduit 50 can advantageously be surrounded by a conduit 53 which has a heat capacity per unit length equal to that of column 10 and the packing included therein. The inner diameter of diffuser 33 should be as nearly equal to the external diameter of column 10 as is mechanically feasible to promote heat transfer between these two elements.

Figure 4:
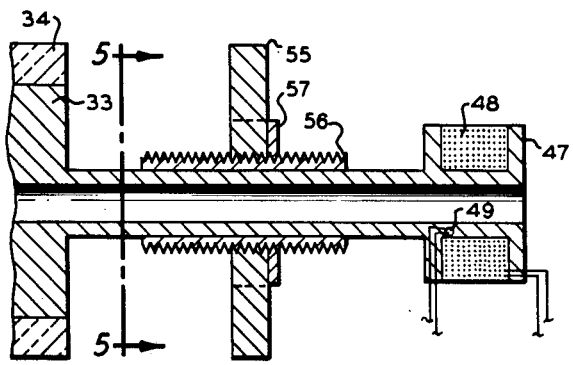
FIGURE 4 is a partial view of a modified form of the furnace.
Figure 5:
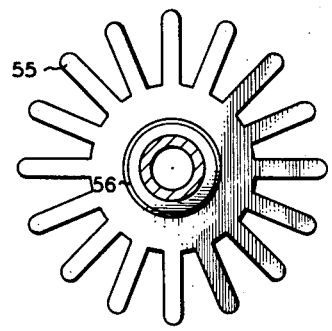
FIGURE 5 is a view taken along line 5—5 in FIGURE 4.

A second embodiment of the furnace of this invention is illustrated in FIGURES 4 and 5. This furnace is identical to the furnace previously described except that a finned heat radiator 55 is mounted on a threaded sleeve 56 between diffuser 33 and heater 48. The position of radiator 55 can thus be adjusted, and the radiator can be retained in place by a lock nut 57. This radiator is useful to prevent the temperature of the end of diffuser 33 from becoming elevated above a preselected value.

From the foregoing description it should be evident that there is provided in accordance with this invention an improved furnace for use with a thermochromatographic analyzer. This furnace is capable of establishing a linear temperature gradient between the two ends thereof so that a linear temperature gradient can be maintained along the chromatographic column.

While the invention has been described in conjunction with a present preferred embodiment, it should be evident that it is not limited thereto.

What is claimed is:

1. A thermochromatographic analyzer comprising an elongated conduit containing a material which selectively retards passage therethrough of the constituents of a fluid mixture to be analyzed, means to introduce a fluid mixture to be analyzed into one end of said column, an elongated member of heat conductive material having a central opening therethrough longitudinally of said member, said member enclosing said conduit, a first heating element in thermal contact with one end of said member, a second heating element in thermal contact with the second end of said member, heat insulating material surrounding said member, a third heating element having a central opening therethrough, heat insulating means positioning said third heating element in spaced relationship from said one end of said member longitudinally thereof so as to surround said conduit, a fourth heating element having a central opening therethrough, heat insulating means positioning said fourth heating element in spaced relationship from said second end of said member longitudinally thereof, so as to surround said conduit, means to move said member and said third and fourth heating elements longitudinally along a substantial length of said conduit so as to selectively impel said mixture therethrough, and means to detect the constituents in the effluent from the second end of said column, said second element being at a higher temperature than that of said first element, said third element being at a temperature at most about that of said first element, and said fourth element being at a temperature substantially higher than that of said second element.

2. A thermochromatographic analyzer comprising an elongated conduit containing a material which selectively retards passage therethrough of the constituents of a fluid mixture to be analyzed, means to introduce a fluid mixture to be analyzed into one end of said column, an elongated member of heat conductive material having a central opening therethrough longitudinally of said member, said member enclosing said conduit, a first heating element in thermal contact with one end of said member, a second heating element in thermal contact with the second end of said member, a first temperature sensing means in thermal contact with said one end of said member, means responsive to said first temperature sensing means to supply a heating medium to said first heating element at a rate so as to maintain said one end of said member at a first predetermined temperature, a second temperature sensing means in thermal contact with said second end of said member, means responsive to said second temperature sensing means to supply a heating medium to said second heating element at a rate so as to maintain said second end of said member at a second predetermined temperature, a third heating element having a central opening therethrough, heat insulating means positioning said third heating element in spaced relationship from said one end of said member longitudinally thereof so as to surround said conduit, a third temperature sensing means in thermal contact with said third heating element, means responsive to said third temperature sensing means to supply a heating medium to said third heating element at a rate so as to maintain the region of said third heating element at a third predetermined temperature, a fourth heating element having a central opening therethrough, heat insulating means positioning said fourth heating element in spaced relationship from said second end of said member longitudinally thereof so as to surround said conduit, a fourth temperature sensing means in thermal contact with said fourth heating element, means responsive to said fourth temperature sensing means to supply a heating medium to said fourth heating element at a rate so as to maintain the region of said fourth heating element at a fourth predetermined temperature, a fifth heating element in thermal contact with said member intermediate the ends thereof, a fifth temperature sensing means in thermal contact with said member intermediate the ends thereof, means responsive to said fifth temperature sensing means to supply a heating medium to said fifth heating element at a rate so as to maintain the region of said member intermediate the ends thereof at a fifth predetermined temperature, heat insulating material surrounding said member, means to move said member and said heating elements longitudinally along a substantial length of said conduit so as to selectively impel said mixture therethrough, and means to detect the constituents in the effluent from the second end of said column, said second temperature being higher than said first temperature, said third temperature being at most about that of said first temperature, said fourth temperature being substantially higher than said second temperature, and said fifth temperature being intermediate said first and said second temperatures.

References Cited in the file of this patent
UNITED STATES PATENTS

| | | |
|---|---|---|
| 2,279,368 | Dietert | Apr. 14, 1942 |
| 2,398,818 | Turner | Apr. 23, 1946 |
| 2,491,210 | Rennie | Dec. 13, 1949 |
| 2,743,995 | Sherrick | May 1, 1956 |
| 2,820,132 | Krause | Jan. 14, 1958 |
| 2,826,908 | Skarstrom | Mar. 18, 1958 |